US012570820B2

(12) United States Patent 
Apeldorn et al.

(10) Patent No.: US 12,570,820 B2 
(45) Date of Patent: Mar. 10, 2026

(54) FOAMED POLYMERIC COMPOSITION

(71) Applicant: 3M INNOVATIVE PROPERTIES COMPANY, St. Paul, MN (US)

(72) Inventors: Thomas Apeldorn, Mönchengladbach (DE); Michael Kempf, Neuss (DE); Jeffrey P. Kalish, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 881 days.

(21) Appl. No.: 17/755,945

(22) PCT Filed: Nov. 23, 2020

(86) PCT No.: PCT/IB2020/061049 
§ 371 (c)(1), 
(2) Date: May 12, 2022

(87) PCT Pub. No.: WO2021/105854 
PCT Pub. Date: Jun. 3, 2021

(65) Prior Publication Data 
US 2022/0380567 A1 Dec. 1, 2022

(30) Foreign Application Priority Data

Nov. 26, 2019 (EP) ..................................... 19211515

(51) Int. Cl. 
*B01F 33/82* (2022.01) 
*B01F 23/20* (2022.01) 
(Continued)

(52) U.S. Cl. 
CPC .......... *C08J 9/122* (2013.01); *B01F 23/2351* (2022.01); *B01F 23/291* (2022.01); 
(Continued)

(58) Field of Classification Search 
CPC .... C08J 9/122; C08J 2201/03; C08J 2203/06; 
C08J 2323/12; C08J 2353/02; 
(Continued)

(56) References Cited

U.S. PATENT DOCUMENTS

| 4,206,165 A | 6/1980 | Dukess |
| 8,680,178 B2 | 3/2014 | Meier et al. |

(Continued)

FOREIGN PATENT DOCUMENTS

| DE | 3712749 C1 | 7/1988 |
| DE | 102007050681 A1 | 4/2009 |

(Continued)

OTHER PUBLICATIONS

International Search Report for PCT International Application No. PCT/IB2020/061049, mailed on Mar. 9, 2021, 6 pages.

(Continued)

*Primary Examiner* — K. Boyle 
(74) *Attorney, Agent, or Firm* — Philip P. Soo; Lynn R. Hunsberger

(57) ABSTRACT

The present disclosure relates to an extrusion apparatus comprising: a) a planetary roller extruder; b) a melt pump arranged downstream of the extruder; c) optionally, a fluid feeding equipment; d) a static cooling mixer equipment arranged downstream of the melt pump; e) a foaming equipment arranged downstream of the static cooling mixer equipment. The present disclosure also relates to a process of manufacturing a foamed polymeric composition and uses thereof.

5 Claims, 1 Drawing Sheet

(51) Int. Cl.

| | |
|---|---|
| *B01F 23/235* | (2022.01) |
| *B01F 23/70* | (2022.01) |
| *B01F 23/80* | (2022.01) |
| *B01F 27/75* | (2022.01) |
| *B01F 33/71* | (2022.01) |
| *B01F 33/81* | (2022.01) |
| *B01F 33/83* | (2022.01) |
| *B01F 35/71* | (2022.01) |
| *B01F 35/95* | (2022.01) |
| *C08J 9/12* | (2006.01) |
| *B01F 35/90* | (2022.01) |
| *B01F 101/00* | (2022.01) |

(52) U.S. Cl.

CPC .......... *B01F 23/703* (2022.01); *B01F 23/802* (2022.01); *B01F 27/755* (2022.01); *B01F 33/71* (2022.01); *B01F 33/8212* (2022.01); *B01F 35/7176* (2022.01); *B01F 35/95* (2022.01); *B01F 2035/98* (2022.01); *B01F 2035/99* (2022.01); *B01F 2101/2805* (2022.01); *B01F 2215/0468* (2013.01); *B01F 2215/0472* (2013.01); *C08J 2201/03* (2013.01); *C08J 2203/06* (2013.01); *C08J 2323/12* (2013.01); *C08J 2353/02* (2013.01)

(58) Field of Classification Search

CPC .. B01F 23/2351; B01F 23/291; B01F 23/703; B01F 23/802; B01F 27/755; B01F 33/71; B01F 33/8212; B01F 35/7176; B01F 35/95; B01F 2035/98; B01F 2035/99; B01F 2101/2805; B01F 2215/0468; B01F 2215/0472; B29C 48/03; B29C 48/144; B29C 48/362; B29C 48/387; B29C 48/76; B29C 48/802; B29C 48/82; B29C 2105/0097; B29C 2105/04; B29C 44/3446

See application file for complete search history.

(56) References Cited

U.S. PATENT DOCUMENTS

| | | | |
|---|---|---|---|
| 9,499,676 B2 | 11/2016 | Burmeister et al. | |
| 10,589,452 B2 | 3/2020 | Rust | |
| 2002/0151608 A1 | 10/2002 | Gehlsen | |
| 2004/0033350 A1 | 2/2004 | Gehlsen | |
| 2005/0175830 A1 | 8/2005 | Wiese et al. | |
| 2008/0138598 A1 | 6/2008 | Michel | |
| 2009/0221744 A1 | 9/2009 | Thormeier et al. | |
| 2010/0273925 A1* | 10/2010 | Allmendinger | C08J 9/0023 524/394 |
| 2011/0306690 A1 | 12/2011 | Bandera | |
| 2012/0004335 A1 | 1/2012 | Hamer | |
| 2015/0037559 A1 | 2/2015 | Dollase et al. | |
| 2016/0101546 A1 | 4/2016 | Gneuss et al. | |
| 2016/0145406 A1 | 5/2016 | Bieber et al. | |

FOREIGN PATENT DOCUMENTS

| | | | | |
|---|---|---|---|---|
| DE | 102013215296 A1 | 2/2015 | | |
| DE | 102015008406 A1 | 4/2017 | | |
| EP | 1078968 A1 | 2/2001 | | |
| EP | 1080865 A1 | 3/2001 | | |
| EP | 1211048 B1 | 6/2002 | | |
| EP | 1719600 B1 | 11/2006 | | |
| EP | 2138294 A1 | 12/2009 | | |
| EP | 1056584 B2 | 12/2010 | | |
| EP | 2098354 B1 | 4/2011 | | |
| EP | 2235098 B1 | 3/2013 | | |
| EP | 2737988 B1 | 6/2014 | | |
| EP | 2414143 B1 | 7/2014 | | |
| EP | 2918388 A1 | 9/2015 | | |
| EP | 1687100 B2 | 2/2020 | | |
| GB | 2204524 A | 11/1988 | | |
| JP | 11147943 A | 6/1999 | | |
| WO | 1999042276 A1 | 8/1999 | | |
| WO | 2001044400 A1 | 6/2001 | | |
| WO | WO-0141995 A1 * | 6/2001 | ........ | B29C 44/3446 |
| WO | 2003092982 A2 | 11/2003 | | |
| WO | 2009052898 A1 | 4/2009 | | |
| WO | 2009090119 A1 | 7/2009 | | |
| WO | 2010112346 A1 | 10/2010 | | |
| WO | 2014183984 A1 | 11/2014 | | |

OTHER PUBLICATIONS

Winck, "CO2-Assisted Foaming of PLA by Using a Planetary Roller Extruder for an Enhanced Mass and Heat Transfer", 16th International Conference on Advances; In Foam Materials & Technology, [retrieved on Jun. 3, 2020], URL: <URL:https://www.researchgate.net/publication/329271539_C02-assisted_foaming_of_PLA_by_using_a_planetary_roller_extruder_for_an_enhanced_mass_and_heat_transfer>, 2018, p. 1, XP002799250.

Winck, "Investigation of CO2-blown Polylactide Foams by Experimental Characterization and Theoretical Modeling", 12th International Symposium on Supercritical Fluids, [retrieved on Jun. 3, 2020], URL: <https://www.researchgate.net/publication/329273087_Investigation_of_C02-blown_polylactide_foams_by_experimental_characterization_and_theoretical_modeling>, 2018, pp. 1-9, XP002799249.

* cited by examiner

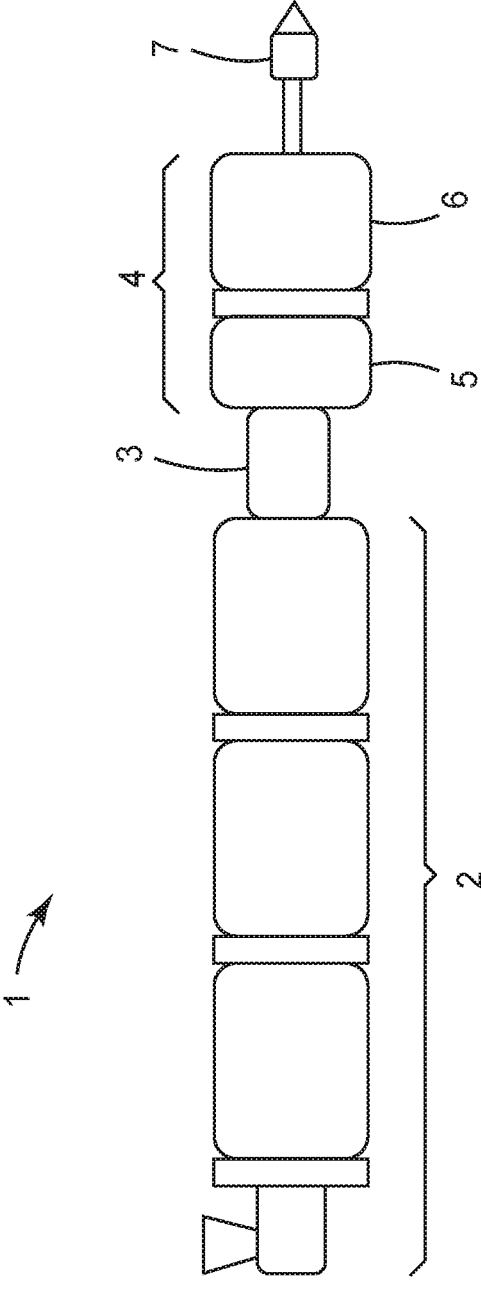

FOAMED POLYMERIC COMPOSITION

CROSS REFERENCE TO RELATED APPLICATIONS

This application is a national stage filing under 35 U.S.C. 371 of PCT/IB2020/061049, filed Nov. 23, 2020, which claims the benefit of European Patent Application No. 19211515.2, filed Nov. 26, 2019, the disclosure of which is incorporated by reference in its/their entirety herein.

TECHNICAL FIELD

The present disclosure relates generally to the field of foamed polymeric compositions, more specifically to the field of foamed adhesive compositions. The present disclosure also relates to a method of manufacturing such foamed polymeric compositions and to an extrusion apparatus suitable for forming such foamed polymeric compositions.

BACKGROUND

Foamed polymeric compositions have been known for quite some time and have been used for various applications including mechanical buffering, such as shock absorption and vibration damping, as well as compliance to irregular substrates. Partly due to these beneficial properties, foamed polymeric compositions have been increasingly used for the manufacturing of adhesive compositions and adhesive tapes, in particular pressure-sensitive adhesive tapes.

Adhesives have been used for a variety of marking, holding, protecting, sealing and masking purposes. Adhesive tapes generally comprise a backing, or substrate, and an adhesive. One type of adhesive which is particularly preferred for many applications is represented by pressure sensitive adhesives. As applications for pressure-sensitive adhesives have increased substantially in recent years, performance requirements have become increasingly demanding.

Materials that have been found to function well as pressure sensitive adhesives are polymers designed and formulated to exhibit the requisite viscoelastic properties resulting in a desired balance of tack, peel adhesion, and shear strength. The most commonly used polymers for preparation of pressure sensitive adhesives are various (meth)acrylate-based copolymers, natural rubber, synthetic rubbers, and silicones.

Pressure sensitive adhesive polymeric foams are used as attachment devices for a wide variety of assembly and manufacturing applications, such as interior or exterior automotive mounting of panels and moldings. In a variety of such applications, adhesion to rough or irregular surfaces is desired or necessitated. Under these circumstances, thicker conformable pressure sensitive adhesive foams generally outperform thin pressure sensitive adhesives (such as those less than 125 microns thick). In addition, many applications require pressure sensitive adhesives to support a load at elevated temperatures, typically in the range of from 70° C. to 90° C., for which high cohesive strengths are required.

In addition to increasing performance requirements for pressure sensitive adhesives, volatile organic compounds (VOC) reduction regulations are becoming increasingly important in particular for various kind of interior applications (occupational hygiene and occupational safety) such as e.g. in the construction market or in the automotive or electronics industries. Known acrylate-based pressure sensitive adhesives typically contain notable amounts of low molecular weight organic residuals, such as un-reacted monomers arising from their polymerization process, polymerization initiator residuals, contaminations from raw materials or degradation products formed during the manufacturing process. These low molecular weight residuals qualifying as VOC may diffuse out of the adhesive tape and can be potentially harmful. Furthermore, the most commonly known method for foaming polymeric compositions, in particular pressure sensitive adhesive compositions, involves using expandable microspheres which typically comprise materials qualifying as VOC and therefore contribute in increasing the overall VOC content.

The reduction of organic solvent usage in the manufacturing process of pressure sensitive adhesives has quickly emerged as one straightforward means to reduce the overall VOC levels. The use of specific scavengers for organic contaminants, as described in WO 01/44400 (Yang), is another alternative way to achieve reduced VOC levels. However, these solutions for reducing overall VOC levels are often associated with increased manufacturing complexity and production costs. Also, the overall VOC levels observed often do not fulfill the requirements for various kind of interior applications such as e.g. in the construction market or in the automotive or electronics industries. Another alternative solution known in the art involves using specific rubber-based polymeric material, as described e.g. in US-A1-2016145406 (Bieber et al.). The disclosed solution typically suffers from lack of versatility and formulation flexibility.

Without contesting the technical advantages associated with the pressure sensitive adhesives known in the art, there is still a need for a stable and cost-effective foamed polymeric composition provided with excellent overall VOC characteristics.

SUMMARY

According to one aspect, the present disclosure relates to an extrusion apparatus comprising:
  a) a planetary roller extruder;
  b) a melt pump arranged downstream of the extruder;
  c) optionally, a fluid feeding equipment;
  d) a static cooling mixer equipment arranged downstream of the melt pump;
  e) a foaming equipment arranged downstream of the static cooling mixer equipment.

In another aspect, the present disclosure is directed to a process of manufacturing a foamed polymeric composition, comprising the steps of:
  a) providing an extrusion apparatus comprising a planetary roller extruder and a foaming equipment arranged downstream of the extrusion apparatus;
  b) providing a hot melt processable polymeric composition in the planetary roller extruder;
  c) optionally, degassing the hot melt processable polymeric composition;
  d) optionally, exposing the hot melt processable polymeric composition to increased pressure and temperature conditions;
  e) providing a physical foaming agent;
  f) mixing the hot melt processable polymeric composition and the physical foaming agent in the extrusion apparatus thereby forming a precursor of a foamed polymeric composition;
  g) optionally, reducing the pressure and/or temperature conditions of the precursor of a foamed polymeric composition; and

h) passing the precursor of a foamed polymeric composition through the foaming equipment and exposing the composition to a reduced pressure, whereby the physical bowing agent expands resulting in foaming of the precursor of a foamed polymeric composition.

According to still another aspect, the present disclosure relates to a foamed polymeric composition obtained from the process as described above.

In yet another aspect, the present disclosure is directed to the use of a foamed polymeric composition as described above for industrial applications, in particular for construction market applications, transportation market applications and electronic applications.

BRIEF DESCRIPTION OF THE DRAWINGS

FIG. 1 illustrates a schematic side view of an extrusion apparatus according to one aspect of the present disclosure.

DETAILED DESCRIPTION

According to a first aspect, the present disclosure relates to an extrusion apparatus comprising:
a) a planetary roller extruder;
b) a melt pump arranged downstream of the extruder;
c) optionally, a fluid feeding equipment;
d) a static cooling mixer equipment arranged downstream of the melt pump;
e) a foaming equipment arranged downstream of the static cooling mixer equipment.

In the context of the present disclosure, it has been surprisingly found that extrusion apparatus as described above is particularly suitable for forming a foamed polymeric composition provided with excellent characteristics and performance as to overall VOC levels reduction.

The foamed polymeric compositions according to the present disclosure are characterized by providing low VOC levels, typically less than 400 ppm, when measured by thermal desorption analysis according to test method VDA278. In some advantageous aspects of the disclosure, the foamed polymeric compositions as described herein are characterized by very low or even substantial absence of perceptible odor.

As such, the foamed polymeric compositions produced while using the extrusion apparatus as described above are particularly suited for (industrial) interior applications, more in particular for construction market applications, automotive applications or electronic applications. In the context of automotive applications, the foamed polymeric compositions as described herein may find particular use for adhering e.g. automotive body side mouldings, weather strips or rearview mirrors. Regarding electronic applications, the foamed polymeric compositions as described herein are particularly suitable for the fixation of display panels in mobile hand-held electronic devices.

Without wishing to be bound by theory, it is believed that the excellent characteristics and performance as to overall VOC levels reduction of the foamed polymeric compositions directly result from the use of the extrusion apparatus as described above, in particular to the use of the four constituting elements of the apparatus (i.e. the planetary roller extruder, the melt pump, the optional fluid feeding equipment, the static cooling mixer and the foaming equipment) arranged in the very specific sequence as detailed above.

In the context of the present disclosure, it has been further surprisingly found that extrusion apparatus as described above is outstandingly suitable for the foaming of a polymeric composition with a physical foaming agent which is in particular provided in supercritical conditions of the physical foaming agent.

The use of a physical foaming agent has been found to be particularly beneficial in the context of the present disclosure as it provides excellent overall VOC levels reduction performance, and in particular improved VOC levels reduction when compared to using expandable microspheres which is one of the most commonly known technical solution for foaming polymeric compositions. The use of a physical foaming agent further obviates the need to take specific technical measures to preserve the otherwise sensitive expandable microspheres during the overall processing.

The use of a physical foaming agent specifically provided in supercritical conditions has been found to allow higher loading and faster diffusion rate of the physical foaming agent into the (hot melt processable) polymeric composition, when compared to the use of a physical foaming agent in non-supercritical state. Physical foaming agents in supercritical state also provide more homogeneous and stable distribution of the physical foaming agent into the polymeric melt, thereby producing an improved solution of the physical foaming agent.

In the context of the present disclosure, it has been further found that the use of a planetary roller extruder as the (exclusive) hot melt mixing and processing equipment is outstandingly suitable to achieve VOC levels reduction due in particular to its excellent devolatilization performance during hot melt processing of the polymeric composition. Without wishing to be bound by theory, it is believed that this excellent VOC reduction performance of the planetary roller extruder as hot melt processing equipment is due in particular to the following attributes: low shear mixing, high surface area and excellent melt temperature control during processing of the polymeric composition. In particular, it is believed that the intensive elongational flow/mixing provided by the planetary extruder, in combination with the relatively low level of shear energy enables improved dispersing mixing. The large contact surface area due to the specific geometry of the spindles used in the planetary roller extruder is believed to not only improve the degassing effectiveness of the extruder, but to also to provide improved heat and energy dissipation during processing. As such, the use of a planetary roller extruder also allows using shear and temperature sensitive materials.

For at least part of the technical performance attributes described above, the use of a planetary roller extruder as hot melt processing equipment is generally more advantageous than the use of screw extruders such as single screw extruders or even twin-screw extruders in the context of a process of forming a foamed polymeric composition.

The use of a planetary roller extruder in the context of a process of forming a foamed polymeric composition by using physical foaming agent, in particular in supercritical conditions, is particularly counterintuitive as planetary roller extruders are generally recognized as not being suitable to be used in combination with physical foaming agents, especially when provided in supercritical conditions. Indeed, and because of the high free volume within the barrel sections of the planetary roller extruder, a high back flow of material is expected to result in a very low pump efficiency which is normally unsuitable for physical foaming agents, in particular inappropriate to create the type of high pressure needed for the foaming with a physical foaming agent in a supercritical state. Moreover, if reaching the suitable pressures needed for the foaming with a physical foaming agent would be possible, the processing zone of the planetary roller barrels would be expected to be fully filled and a degassing or devolatilization step would normally not be possible. A partially filled processing zone would be normally needed to avoid the leakage of processed material under the pressure conditions needed for the foaming and degassing steps.

In the context of the present disclosure, it has been counterintuitively found that planetary roller extruders can be used as hot melt processing equipment in the context of a process of forming a foamed polymeric composition by using physical foaming agent, in particular in supercritical conditions.

In order to enable the somewhat contradicting combination of foaming with a physical foaming agent, in particular in supercritical conditions, and efficiently devolatilization, the planetary roller extruder is combined with:

a) a melt pump arranged downstream of the extruder;

b) optionally, a fluid feeding equipment;

c) a static cooling mixer equipment arranged downstream of the melt pump; and d) a foaming equipment arranged downstream of the static cooling mixer.

Advantageously, the planetary roller extruder for use herein does not require any specific design modification and does not require to be gas-tight when used in the process of forming a foamed polymeric composition. Accordingly, conventional or commonly known planetary roller extruders may be used in the context of the present disclosure. Advantageously still, the various other constituting elements of the extrusion apparatus may be simply retrofitted to the planetary roller extruder in the above described sequence.

According to an advantageous aspect, the melt pump is divided into two different processing zones, each having a different pressure level. The pressure at the entrance of the pump is relatively low to enable efficient devolatilization in the planetary roller extruder upstream the melt pump. The pressure at the exit of the melt pump is relatively high to enable the foaming with the physical foaming agent, in particular when provided in its supercritical conditions. Advantageously, this beneficial separation of the melt pump in two processing zones allows choosing optimal processing parameters (such as e.g. temperature, screw speeds) within the planetary roller extruder, which are disconnected from and not influenced by the processing parameters needed for the foaming with the physical foaming agent.

In order to further enable the dosing and foaming process with the physical foaming agent, a static cooling mixer equipment is arranged downstream of the melt pump, which is used to inject the physical foaming agent, especially at relatively high pressure, to achieve a good distribution of the physical foaming agent within the (hot melt processed) polymeric composition, and finally to cool the resulting (melt) composition.

In the context of the present disclosure, it has been found that physical foaming agents act like plasticizers when mixed with the (hot melt processed) polymeric composition, thereby substantially reducing the viscosity of the resulting (melt) composition to such an extent that the viscosity characteristic of the (melt) composition might be unsuitable for the overall foaming process. It was found that suitable cooling/mixing beneficially impacts (in particular increases) the viscosity of the (melt) composition thereby rendering possible the further processing steps and the overall foaming process. It was additionally found that suitable cooling/mixing in the static cooling mixer equipment advantageously impacts the distribution of the physical foaming agent into the (melt) composition and provides excellent cell stabilization performance in the resulting foamed polymeric composition.

According to the present disclosure, the extrusion apparatus as described herein further comprises a foaming equipment arranged downstream of the static cooling mixer. The foaming equipment has the technical function of finalizing the foaming process by allowing the physical foaming agent to expand, in particular at the time it exits the foaming equipment. More advantageously, the foaming equipment is able to cause nucleation of the physical foaming agent and cell formation within the precursor of a foamed polymeric composition.

In the context of the present disclosure, the term "foamed polymeric composition" is meant to designate a polymeric material which comprises voids, typically in an amount of at least 5% by volume, typically from 10% to 55% by volume or from 10% to 45% by volume. The voids, such as cells, are formed by the physical foaming agent according to the foaming as described hereinafter.

In the context of the present disclosure, the expression "physical foaming agent in supercritical conditions" is meant to refer to those supercritical pressure (Pc) and supercritical temperature (Tc) conditions under which the physical foaming agent, which is typically a gas at ambient temperature (23° C.) and pressure (1013 hPa), is compressed to a state where it has the density and solvation characteristics of a liquid, but the viscosity, permeability and diffusivity of a gas. A supercritical physical foaming agent is a single-phase material which exists above a critical point, which point is determined by the supercritical pressure (Pc) and supercritical temperature (Tc), and which values depend on the particular physical foaming agent. As an example, the Tc and Pc values for carbon dioxide are respectively 31° C. and 7.4 MPa.

The term "nucleation" is meant to designate a process by which a homogeneous solution of polymeric material and dissolved molecules of a species, that is typically a gas under ambient conditions, undergoes formations of clusters of molecules of the species that define "nucleation sites" from which cells will grow. In other words, the nucleation designates a change from a homogeneous solution to a multiphase mixture in which, throughout the polymeric material, sites of aggregation of at least several molecules of physical foaming agent are formed.

The extrusion apparatus of the present disclosure comprises a planetary roller extruder as a first constituting element. Planetary roller extruders for use herein are not particularly limited. Any commonly known planetary roller extruder may be used in the context of the present disclosure without requiring any specific modification or adaptation. Suitable planetary roller extruders for use herein may be easily identified by those skilled in the art, in the light of the present disclosure. Exemplary planetary roller extruders for use herein are commercially available from Entex GmbH, Germany.

The extrusion apparatus of the present disclosure further comprises a melt pump arranged downstream of the planetary roller extruder. Melt pumps for use herein are not particularly limited. Suitable melt pumps for use herein may be easily identified by those skilled in the art, in the light of the present disclosure. Exemplary melt pumps for use herein are commercially available from Witte Pumps & Technology GmbH, Mahr Metering Systems GmbH, Germany or Nordson Corporation, USA.

According to an advantageous aspect, the melt pump for use herein is designed and configured such as to provide a first processing zone Z1 having a pressure P1 (also referred to hereinafter as low-pressure zone) and a second processing zone Z2 having a pressure P2 (also referred to hereinafter as high-pressure zone) within the melt pump.

In a typical aspect, the two processing zones Z1 and Z2 are distinct and independent zones of the advantageous melt pump, which are however in fluid communication with each other.

In another typical aspect of this advantageous melt pump for use herein, the pressure P2 of the second processing zone Z2 is greater than the pressure P1 of the first processing zone Z1.

According to a beneficial aspect of this advantageous melt pump, the pressure P2 is greater than 6.5 MPa, greater than 7 MPa, greater than 7.5 MPa, greater than 8 MPa, greater than 10 MPa, greater than 12 MPa, greater than 15 MPa, greater than 18 MPa, greater than 20 MPa, greater than 23 MPa, greater than 25 MPa, or even greater than 28 MPa.

According to another beneficial aspect of this advantageous melt pump, the pressure P2 is in a range from 7 to 30 MPa, from 7.5 to 30 MPa, from 8 to 28 MPa, from 10 to 28 MPa, from 15 to 28 MPa, from 18 to 28 MPa, or even from 20 to 28 MPa.

According to still another beneficial aspect of this advantageous melt pump, the difference between P1 and P2 is greater than 3 MPa, greater than 5 MPa, greater than 10 MPa, greater than 15 MPa, or even greater than 20 MPa.

According to yet another beneficial aspect of this advantageous melt pump, the pressure P1 is no greater than 4.0 MPa, no greater than 3.5 MPa, no greater than 2.5 MPa, no greater than 2.0 MPa, no greater than 1.5 MPa, or even no greater than 1.0 MPa.

The optimal values of pressures P1 and P2 of the two processing zones Z1 and Z2 may be adjusted depending on the specific polymeric composition, the specific physical foaming agent, the specific configurations of the planetary roller extruder, the melt pump, the optional fluid feeding equipment and the static cooling mixer equipment.

The extrusion apparatus of the present disclosure further comprises a static cooling mixer equipment arranged downstream of the melt pump. Static cooling mixer equipment for use herein are not particularly limited. Suitable static cooling mixer equipment for use herein may be easily identified by those skilled in the art, in the light of the present disclosure. Exemplary static cooling mixer equipment for use herein are commercially available from Promix Solutions AG, Germany.

According to an advantageous aspect of the extrusion apparatus of the disclosure, the static cooling mixer equipment for use herein is a two-part equipment which comprises a static mixer and a cooling mixer. Advantageously, the static mixer is selected from the group of static injection mixers.

Suitable static mixers and cooling mixers for use herein may be easily identified in the light of the present disclosure by those skilled in the art of polymer extrusion.

According to a particular aspect of the disclosure, the static mixer is directly arranged downstream of the melt pump and the cooling mixer is directly arranged downstream of the static mixer.

In another advantageous aspect of static cooling mixer for use herein, the static mixer comprises static mixing elements, which are in particular not actively temperature controlled.

In still another advantageous aspect of static cooling mixer for use herein, the cooling mixer comprises static mixing elements which are hollow, and temperature controlled, in particular by oil.

According to a preferred aspect, the extrusion apparatus of the present disclosure further comprises a fluid feeding equipment. Fluid feeding equipment for use herein are not particularly limited. Suitable fluid feeding equipment for use herein may be easily identified by those skilled in the art, in the light of the present disclosure.

In an advantageous aspect, the fluid feeding equipment for use herein is selected from the group of gas feeding equipment and may beneficially take the form of a (gas) injection port.

According to a preferred aspect of the disclosure, the fluid feeding equipment for use herein is in fluid connection with the static cooling mixer equipment, in particular with the static mixer. According to this preferred execution, the static mixer for use herein may qualify as a static injection mixer.

The fluid feeding equipment for use herein may be advantageously used to provide the physical foaming agent, in particular to introduce the physical foaming agent into the hot melt processed polymeric composition.

The extrusion apparatus of the present disclosure further comprises a foaming equipment arranged downstream of the static cooling mixer. Foaming equipment for use herein are not particularly limited. Suitable foaming equipment for use herein may be easily identified by those skilled in the art, in the light of the present disclosure. Suitable foaming equipment for use herein are commercially available e.g. from AxFlow GmbH, Germany.

In an advantageous aspect, the foaming equipment for use herein is selected from the group of foaming dies. Typically, the foaming equipment for use herein also functions as a shaping equipment.

According to one advantageous aspect of the extrusion apparatus, the foaming equipment for use herein is a foaming die, in particular a single layer or a multi-layer die.

According to an exemplary aspect, the foaming equipment for use herein is selected from the group consisting of slot dies, tubular dies, annular dies, strand dies, single bubble dies, and double bubble dies.

In one beneficial aspect of the disclosure, the extrusion apparatus further comprises degassing means, in particular vacuum pumps or vacuum degassing units.

In one advantageous aspect, the degassing means for use herein are in fluid connection with the planetary roller extruder, in particular with the downstream section of the planetary roller extruder.

In the context of the present disclosure, it has been found that the use of degassing means in combination with the extrusion apparatus advantageously affects its overall VOC levels reduction performance.

The extrusion apparatus of the present disclosure may further comprise additional secondary equipment commonly known in the art of polymer extrusion. In particular, the extrusion apparatus of the disclosure may further comprise any of solid feeders, liquid feeders, gas feeders, grid melters, drum unloaders, and any combinations thereof. According to an advantageous aspect, the additional equipment is connected to the planetary roller extruder, in particular along the processing unit of the planetary roller extruder.

According to a particularly preferred execution of the present disclosure, the extrusion apparatus for use herein is (substantially) free of additional extrusion equipment, in particular free of additional hotmelt extrusion equipment, more in particular single screw extruder and twin-screw extruder. Preferably, the planetary roller extruder is the sole extrusion equipment of the extrusion apparatus.

FIG. 1 illustrates a schematic side view of an exemplary extrusion apparatus 1 according to one aspect of the present disclosure, wherein the apparatus comprises a planetary roller extruder 2, a melt pump 3 arranged directly downstream of the extruder 2, a static cooling mixer equipment 4 which is arranged directly downstream of the melt pump 3 and comprising a static mixer 5 and a cooling mixer 6, and wherein the extrusion apparatus 1 further comprises a foaming equipment 7 arranged directly downstream of the static cooling mixer equipment 4.

In another aspect, the present disclosure is directed to a process of manufacturing a foamed polymeric composition, comprising the steps of:

- a) providing an extrusion apparatus comprising a planetary roller extruder and a foaming equipment arranged downstream of the extrusion apparatus;
- b) providing a hot melt processable polymeric composition in the planetary roller extruder;
- c) optionally, degassing the hot melt processable polymeric composition;
- d) optionally, exposing the hot melt processable polymeric composition to increased pressure and temperature conditions, in particular to pressure and temperature conditions greater than the supercritical pressure ($P_c$) and the supercritical temperature ($T_c$) conditions for the physical foaming agent;
- e) providing a physical foaming agent;
- f) mixing the hot melt processable polymeric composition and the physical foaming agent in the extrusion apparatus thereby forming a precursor of a foamed polymeric composition;
- g) optionally, reducing the pressure and/or temperature conditions of the precursor of a foamed polymeric composition, in particular whereby the pressure and temperature conditions are still greater than the supercritical pressure ($P_c$) and the supercritical temperature ($T_c$) conditions for the physical foaming agent; and
- h) passing the precursor of a foamed polymeric composition through the foaming equipment and exposing the composition to a reduced pressure, whereby the physical bowing agent expands resulting in foaming of the precursor of a foamed polymeric composition.

In a typical aspect of this process, the step of mixing the hot melt processable polymeric composition and the physical foaming agent is performed in such pressure and temperature conditions sufficient for the physical foaming agent to be uniformly distributed throughout the hot melt processable polymeric composition.

In an advantageous aspect, the physical foaming agent for use herein is provided and mixed with the hot melt processable polymeric composition in supercritical conditions of the physical foaming agent, in particular in pressure and temperature conditions greater than the supercritical pressure ($P_c$) and the supercritical temperature ($T_c$) conditions for the physical foaming agent.

According to a particular aspect of the process of manufacturing a foamed polymeric composition, the supercritical pressure (Pc) for use herein is greater than 6.5 MPa, greater than 7 MPa, greater than 7.5 MPa, greater than 8 MPa, greater than 10 MPa, greater than 12 MPa, greater than 15 MPa, greater than 18 MPa, greater than 20 MPa, greater than 23 MPa, greater than 25 MPa, or even greater than 28 MPa.

According to more particular aspect, the supercritical pressure (Pc) for use herein is in a range from 7 to 30 MPa, from 7.5 to 30 MPa, from 8 to 28 MPa, from 10 to 28 MPa, from 15 to 28 MPa, from 18 to 28 MPa, or even from 20 to 28 MPa.

According to another particular aspect of the process of manufacturing a foamed polymeric composition, the supercritical temperature (Tc) for use herein is greater than 70° C., greater than 80° C., greater than 90° C., greater than 100° C., greater than 120° C., greater than 140° C., greater than 150° C., greater than 160° C., greater than 180° C., greater than 200° C., greater than 220° C., greater than 240° C., greater than 250° C., greater than 260° C., or even greater than 280° C.

According to still another particular aspect, the supercritical temperature (Tc) for use herein is no greater than 250° C., no greater than 220° C., no greater than 200° C., no greater than 190° C., no greater than 180° C., no greater than 170° C., or even no greater than 160° C.

According to yet another particular aspect of the disclosure, the supercritical temperature (Tc) for use herein is in a range from 75 to 250° C., from 75 to 220° C., from 75 to 180° C., from 80 to 180° C., from 100 to 170° C., from 100 to 165° C., from 110 to 165° C., from 120 to 165° C., from 130 to 165° C., from 140 to 165° C., from 140 to 160° C., or even from 150 to 160° C.

In an advantageous aspect of the process, the step of reducing the pressure and temperature of the precursor of a foamed polymeric composition, whereby the pressure and temperature conditions are still greater than the supercritical pressure (Pc) and the supercritical temperature (Tc) conditions for the physical foaming agent, is performed such that the reduced temperature is equal to or less than 50° C. below the initial temperature of the precursor of a foamed polymeric composition.

In another advantageous aspect of the process, the step of reducing the pressure and temperature of the precursor of a foamed polymeric composition, whereby the pressure and temperature conditions are still greater than the supercritical pressure (Pc) and the supercritical temperature (Tc) conditions for the physical foaming agent, is performed such that the reduced temperature is no greater than 250° C., no greater than 220° C., no greater than 200° C., no greater than 180° C., no greater than 150° C., no greater than 140° C., no greater than 130° C., no greater than 120° C., no greater than 110° C., no greater than 100° C., or even no greater than 90° C.

In still another advantageous aspect of the process, the step of reducing the pressure and temperature conditions of the precursor of a foamed polymeric composition, whereby the pressure and temperature conditions are still greater than the supercritical pressure (Pc) and the supercritical temperature (Tc) conditions for the physical foaming agent, is performed such that the reduced pressure is no greater than 20 MPa, no greater than 19 MPa, no greater than 18 MPa, no greater than 17 MPa, no greater than 16 MPa, no greater than 15 MPa, no greater than 14 MPa, or even no greater than 13 MPa.

In yet another advantageous aspect of the process, the step of reducing the pressure and temperature of the precursor of a foamed polymeric composition, whereby the pressure and temperature conditions are still greater than the supercritical pressure ($P_c$) and the supercritical temperature ($T_c$) conditions for the physical foaming agent, is performed such that the reduced pressure is in a range from 8 to 18 MPa, from 9 to 16 MPa, from 10 to 15 MPa, from 11 to 15 MPa, from 11 to 14 MPa, from 12 to 14 MPa, or even from 12 to 13 MPa.

According to a typical aspect of the process, the step of passing the precursor of the foamed polymeric composition through the foaming equipment and exposing the composition to a reduced pressure, is performed at atmospheric pressure (i.e. about 101.3 kPa).

According to another typical aspect of the process, the step of passing the precursor of the foamed polymeric composition through the foaming equipment and exposing the composition to a reduced pressure, is performed at a temperature greater than 20° C., greater than 25° C., greater than 40° C., greater than 80° C., greater than 100° C., greater than 150° C., or even greater than 200° C.

According to still another typical aspect of the process, the step of passing the precursor of the foamed polymeric composition through the foaming equipment and exposing the composition to a reduced pressure, is performed at a temperature no greater than 250° C., no greater than 220° C., no greater than 200° C., no greater than 180° C., no greater than 150° C., no greater than 120° C., no greater than 110° C., no greater than 100° C., or even no greater than 90° C.

According to still another typical aspect of the process, the step of passing the precursor of the foamed polymeric composition through the foaming equipment and exposing the composition to a reduced pressure, is performed at a temperature in a range from 25 to 250° C., from 25 to 220° C., from 25 to 200° C., from 25 to 180° C., from 25 to 160° C., from 25 to 140° C., from 25 to 120° C., from 25 to 110° C., from 30 to 110° C., from 40 to 100° C., from 50 to 100° C., from 60 to 100° C., from 60 to 95° C., from 70 to 95° C., or even from 70 to 90° C.

According to still another typical aspect of the process, the step of passing the precursor of the foamed polymeric composition through the foaming equipment and exposing the composition to a reduced pressure causes nucleation of the physical foaming agent and cell formation within the precursor of a foamed polymeric composition.

In an advantageous of the present disclosure, the physical foaming agent for use herein is selected from the group consisting of carbon dioxide, nitrogen, $SF_6$, nitrous oxide, perfluorinated fluids, hydrofluorocarbons, hydrochlorofluorocarbons, hydrocarbons (such as e.g. heptane, pentane), argon, helium, noble gases, air (nitrogen and oxygen blend), and any combinations or mixtures thereof.

In a more advantageous aspect, the physical foaming agent for use herein is selected from the group consisting of carbon dioxide, nitrogen, air, and any combinations or mixtures thereof.

According to a preferred aspect of the disclosure, the physical foaming agent for use herein is selected to comprise carbon dioxide. More preferably, the physical foaming agent for use herein consists (essentially) of carbon dioxide.

According to a typical aspect of the present disclosure, the hot melt processable polymeric composition for use herein is selected from the group consisting of thermoplastic materials, elastomeric materials, thermoplastic elastomer materials, thermoplastic non-elastomeric materials, and any combinations or mixtures thereof.

According to an advantageous aspect of the present disclosure, the hot melt processable polymeric material for use herein is selected from the group consisting of (amorphous or semi-crystalline) thermoplastic materials, and any combinations or mixtures thereof.

According to a more advantageous aspect of the present disclosure, the hot melt processable polymeric composition for use herein is selected from the group consisting of pressure sensitive adhesive thermoplastic compositions.

According to another advantageous aspect of the present disclosure, the hot melt processable polymeric composition for use herein is selected from the group consisting of rubber-based elastomeric materials, rubber-based non-elastomeric materials, polycarbonates, polyacrylics, polyacrylonitriles, polyvinyl chlorides, alkylene-vinyl acetate copolymers, alkylene-acrylic acid copolymers, polyurethanes, polyesters, polyamides, polyolefins, polyphenylene oxides, and any combinations or mixtures thereof.

According to another advantageous aspect of the present disclosure, the hot melt processable polymeric composition for use herein is selected from the group consisting of rubber-based elastomeric materials, rubber-based non-elastomeric materials, polyacrylics, and any combinations or mixtures thereof.

In a more advantageous aspect of the present disclosure, the hot melt processable polymeric composition for use herein is selected from the group consisting of rubber-based elastomeric materials.

In an even more advantageous aspect of the present disclosure, the rubber-based elastomeric material for use herein is selected from the group consisting of olefinic block copolymers, acrylate block copolymers, styrenic block copolymers, styrene-isoprene-styrene block copolymers, styrene-butadiene-styrene block copolymers, styrene-ethylene/butadiene-styrene block copolymers, styrene-ethylene/propylene-styrene block copolymers, styrene-butadiene random copolymers, polyisoprene polymers, polybutadiene polymers, halogenated butyl rubbers, and any combinations or mixtures thereof.

In a preferred aspect of the present disclosure, the rubber-based elastomeric material for use herein comprises a block copolymer architecture which is in particular selected from the group consisting of olefinic block copolymers, acrylate block copolymers, styrenic block copolymers, styrene-isoprene-styrene block copolymers, styrene-butadiene-styrene block copolymers, styrene-ethylene/butadiene-styrene block copolymers, styrene-ethylene/propylene-styrene block copolymers, and any combinations or mixtures thereof.

In a particularly preferred aspect of the disclosure, the hot melt processable polymeric composition for use herein comprises rubber-based elastomeric materials, which are in particular selected from the group consisting of styrenic block copolymers, more in particular styrene-isoprene-styrene block copolymers and styrene-butadiene-styrene block copolymers.

According to a beneficial aspect of the disclosure, the step of hotmelt processing the polymeric composition in the planetary roller extruder is performed at a processing pressure no greater than 4.0 MPa, no greater than 3.5 MPa, no greater than 2.5 MPa, no greater than 2.0 MPa, no greater than 1.5 MPa, or even no greater than 1.0 MPa.

According to a typical aspect of the disclosure, the optional step of degassing the hot melt processable polymeric composition is performed while the hot melt processable polymeric composition is still in the planetary roller extruder.

According to another typical aspect of the disclosure, the optional degassing step is performed using degassing means, in particular vacuum pumps or vacuum degassing units.

In another typical aspect, the degassing means for use herein are in fluid connection with the planetary roller extruder, in particular with the downstream section of the planetary roller extruder.

According to an advantageous aspect of the present disclosure, the extrusion apparatus for use in the process of manufacturing a foamed polymeric composition, is as described above.

According to a typical aspect of the process of the disclosure, the optional step of exposing the hot melt processable polymeric composition to increased pressure conditions, in particular to pressure conditions greater than the supercritical pressure $(P_c)$ for the physical foaming agent, is performed in the melt pump, in particular in the second processing zone Z2 of the melt pump.

According to another typical aspect of the process of the disclosure, the optional step of exposing the hot melt processable polymeric composition to increased temperature conditions, in particular to temperature conditions greater than the supercritical temperature (Tc) conditions for the physical foaming agent, is performed at least partly in the melt pump, in particular in the second processing zone Z2 of the melt pump.

In an advantageous aspect of the process, the step of providing a physical foaming agent is performed in the static cooling mixer equipment, in particular in the static mixer part of the static cooling mixer equipment.

In another advantageous aspect of the process, the step of providing a physical foaming agent is performed using a fluid feeding equipment in fluid connection with the static cooling mixer equipment, in particular with the static mixer part of the static cooling mixer equipment. Typically, the fluid feeding equipment for use herein takes the form of an injection port.

In another advantageous aspect of the process, the step of mixing the hot melt processable polymeric composition and the physical foaming agent thereby forming a precursor of a foamed polymeric composition, is performed in the static cooling mixer equipment, in particular through the entire length of the static cooling mixer equipment.

In still another advantageous aspect of the process, the optional step of reducing the pressure and temperature conditions of the precursor of a foamed polymeric composition, whereby the pressure and temperature conditions are still greater than the supercritical pressure (Pc) and the supercritical temperature (Tc) conditions for the physical foaming agent, is performed (at least partly) in the static cooling mixer equipment.

All the particular and preferred aspects relating to, in particular, the extrusion apparatus, the planetary roller extruder, the melt pump, the optional fluid feeding equipment, the static cooling mixer equipment, and the foaming equipment, which were described hereinabove in the context of the extrusion apparatus, are fully applicable to the process of manufacturing a foamed polymeric composition.

In another aspect, the present disclosure is directed to a process of reducing volatile organic compounds from a polymeric composition foamed with a physical foaming agent, which comprises the step of using a planetary roller extruder.

In an advantageous aspect of the disclosure, the process of reducing volatile organic compounds comprises the steps of:
  a) providing an extrusion apparatus comprising a planetary roller extruder and a foaming equipment arranged downstream of the extrusion apparatus;
  b) providing a hot melt processable polymeric composition in the planetary roller extruder;
  c) optionally, degassing the hot melt processable polymeric composition;

d) optionally, exposing the hot melt processable polymeric composition to increased pressure and temperature conditions;
  e) providing a physical foaming agent;
  f) mixing the hot melt processable polymeric composition and the physical foaming agent in the extrusion apparatus thereby forming a precursor of a foamed polymeric composition;
  g) optionally, reducing the pressure and/or temperature conditions of the precursor of a foamed polymeric composition; and
  h) passing the precursor of the foamed polymeric composition through the foaming equipment and exposing the composition to a reduced pressure, whereby the physical bowing agent expands resulting in foaming of the precursor of a foamed polymeric composition, in particular at the time it exits the foaming.

In one advantageous aspect of the process of reducing volatile organic compounds, the polymeric composition is foamed with a physical foaming agent provided in supercritical conditions of the physical foaming agent.

In one particularly beneficial aspect of the process of reducing volatile organic compounds, the extrusion apparatus is as described above.

All the particular and preferred aspects relating to, in particular, the extrusion apparatus, the planetary roller extruder, the melt pump, the optional fluid feeding equipment, the static cooling mixer equipment, and the foaming equipment, which were described hereinabove in the context of the extrusion apparatus, are fully applicable to the process of reducing volatile organic compounds from a polymeric composition foamed with a physical foaming agent.

All the particular and preferred aspects relating to, in particular, the various process steps, which were described hereinabove in the context of the process of manufacturing a foamed polymeric composition, are fully applicable to the process of reducing volatile organic compounds from a polymeric composition foamed with a physical foaming agent.

According to still another aspect, the present disclosure relates to a foamed polymeric composition obtained from the processes as described above.

According to a particularly advantageous aspect of the present disclosure, the foamed polymeric composition has a Volatile Organic Compound (VOC) value of less than 400 ppm, less than 380 ppm, less than 360 ppm, less than 350 ppm, less than 340 ppm, less than 300 ppm, less than 280 ppm, less than 260 ppm, less than 250 ppm, less than 240 ppm, less than 220 ppm, less than 200 ppm, less than 180 ppm, less than 160 ppm, or even less than 150 ppm, when measured by thermal desorption analysis according to test method VDA278.

In a beneficial aspect, the foamed polymeric composition of the disclosure has a density in a range from 0.30 to 0.65 $g/cm^3$, from 0.35 to 0.65 $g/cm^3$, from 0.40 to 0.65 $g/cm^3$, from 0.40 to 0.60 $g/cm^3$, from 0.45 to 0.60 $g/cm^3$, from 0.45 to 0.55 $g/cm^3$, or even from 0.45 to 0.55 $g/cm^3$, when measured according to test method ASTM D792.

In another beneficial aspect, the foamed polymeric composition of the disclosure has an average cell size no greater than 300 micrometers, no greater than 280 micrometers, no greater than 260 micrometers, no greater than 240 micrometers, no greater than 220 micrometers, no greater than 200 micrometers, no greater than 180 micrometers, no greater than 160 micrometers, no greater than 140 micrometers, no greater than 120 micrometers, no greater than 100 micrometers, no greater than 80 micrometers, no greater than 70 micrometers, no greater than 60 micrometers, no greater than 50 micrometers, or even no greater than 40 micrometers.

In still another beneficial aspect, the foamed polymeric composition of the disclosure has an average cell size in a range from 30 to 350 micrometers, from 40 to 320 micrometers, from 40 to 300 micrometers, from 40 to 280 micrometers, from 50 to 260 micrometers, from 50 to 240 micrometers, from 50 to 220 micrometers, from 60 to 200 micrometers, from 60 to 180 micrometers, or even from 70 to 180 micrometers.

Unless otherwise indicated, the average cell size of the foamed polymeric composition and cell size distribution polydispersity are measured by Scanning Electron Microscopy (SEM) Imaging using techniques commonly known to those skilled in the art, in particular digital image micrographs and Image Tool Software.

In yet another beneficial aspect, the foamed polymeric composition of the disclosure has a cell size distribution polydispersity in a range from 1.0 to 2.0, or even from 1.0 to 1.5.

Foamed polymeric compositions according to the disclosure, which are provided with relatively small and/or uniform cell sizes have been found to have uniform characteristics and properties throughout the foamed polymeric compositions, as well as advantageous mechanical properties. In particular, foamed polymeric compositions provided with relatively small cell sizes are less prone to defects or cracks propagation through the foam structure, and allow thinner foam substrates to be produced.

In a particularly beneficial aspect of the present disclosure, the foamed polymeric composition as described herein is a foamed pressure sensitive adhesive composition.

According to still another aspect, the present disclosure relates to an assembly comprising a foamed polymeric composition layer as described above.

A foamed polymeric composition layer for use in an assembly has for example a thickness comprised between 100 and 6000 micrometers, between 200 and 4000 micrometers, between 500 and 2000 micrometers, or even between 800 and 1500 micrometers. As will be apparent to those skilled in the art, in the light of the present description, the preferred thickness of the polymeric foam layer will be dependent on the intended application.

In a particular aspect, the assembly of the present disclosure is in the form of a multilayer assembly further comprising a second polymeric layer adjacent to the foamed polymeric composition layer.

According to the particular execution wherein the multilayer assembly further comprises a second polymeric layer adjacent to the foamed polymeric composition layer, the multilayer assembly of the present disclosure may advantageously take the form of skin/core type multilayer assembly, wherein the foamed polymeric composition layer is the core layer of the multilayer assembly and the second polymeric layer is the skin layer of the multilayer assembly. This particular execution is commonly referred to as a dual layer polymeric foam assembly. Skin/core type of multilayer assemblies are well known to those skilled in the art.

Multilayer assemblies according to the present disclosure, and in particular dual layer polymeric foam assemblies, are particularly advantageous when compared to single-layer constructions, in that properties/requirements of the overall assembly such as application issues, deforming issues and energy distribution may be addressed by appropriate formulation of the polymeric foam layer (also commonly referred to as the core layer), while other properties such as e.g. adhesion (quick adhesion) can be adjusted by the formulation of the second polymeric layer (also commonly referred to as the skin layer).

In one particular aspect, it may be advantageous for the multilayer assemblies of the present disclosure to further comprise a third polymeric layer which is preferably adjacent to the foamed polymeric layer in the side of the foamed polymeric layer which is opposed to the side of the foamed polymeric layer adjacent to the second polymeric layer, and thereby forming a three-layered multilayer assembly.

Three-layered multilayer assemblies according to one aspect of the disclosure, may advantageously take the form of a skin/core/skin multilayer assembly, wherein the foamed polymeric layer is the core layer of the multilayer assembly, the second polymeric layer is the first skin layer of the multilayer assembly and the third polymeric layer is the second skin layer of the multilayer assembly.

According to one exemplary aspect, the multilayer assembly of the present disclosure is a multilayer pressure sensitive adhesive assembly, wherein the foamed polymeric layer and/or the second polymeric layer and/or the third polymeric layer are layers based on pressure sensitive adhesive compositions.

According to another exemplary aspect, the multilayer assembly of the present disclosure is a multilayer pressure sensitive adhesive assembly, wherein the foamed polymeric layer is not based on a pressure sensitive adhesive composition and the second polymeric layer and the third polymeric layer are layers based on pressure sensitive adhesive compositions.

In the context of the present disclosure, any combinations of pressure sensitive adhesive-based and non-pressure sensitive adhesive-based layers may be comprised in the multilayer assemblies of the present disclosure.

Multilayer assemblies as described herein may be produced according to techniques well known to those skilled in the art, such as e.g. by co-extrusion.

The assemblies of the present disclosure can be coated/applied upon a variety of substrates to produce adhesive-coated articles. The substrates can be flexible or inflexible and be formed of a polymeric material, glass or ceramic material, metal, or combinations thereof. Suitable polymeric substrates include, but are not limited to, polymeric films such as those prepared from polypropylene, polyethylene, polyvinyl chloride, polyester (polyethylene terephthalate or polyethylene naphthalate), polycarbonate, polymethyl (meth)acrylate (PMMA), cellulose acetate, cellulose triacetate, and ethyl cellulose. Foam backings may be used. Examples of other substrates include, but are not limited to, metal such as stainless steel, metal or metal oxide coated polymeric material, metal or metal oxide coated glass, and the like.

The assemblies of the present disclosure may be used in any article conventionally known to use such assemblies such as labels, tapes, signs, covers, marking indices, display components, touch panels, and the like. Flexible backing materials having microreplicated surfaces are also contemplated. The assemblies as described herein may be coated/applied on a substrate using any conventional coating techniques modified as appropriate to the particular substrate. For example, assemblies may be applied/coated to a variety of solid substrates by methods such as roller coating, flow coating, dip coating, spin coating, spray coating knife coating, and die coating. These various methods of coating allow the assemblies to be placed on the substrate at variable thicknesses thus allowing a wider range of use of the assemblies.

The substrate to which the assemblies may be applied is selected depending on the particular application. For example, the assemblies may be applied to sheeting products (e.g., decorative graphics and reflective products), label stock, and tape backings. Additionally, the assemblies may be applied directly onto other substrates such as a metal panel (e.g., automotive panel) or a glass window so that yet another substrate or object can be attached to the panel or window. Accordingly, the assemblies of the present disclosure may find a particular use in the automotive manufacturing industry (e.g. for attachment of exterior trim parts or for weatherstrips) or in the construction industry.

As such, the foamed polymeric compositions and assemblies according to the present disclosure are particularly suited for (industrial) interior applications, more in particular for construction market applications, automotive applications or electronic applications. In the context of automotive applications, the polymeric foamed compositions as described herein may find particular use for adhering e.g. automotive body side mouldings, weather strips or rearview mirrors. Regarding electronic applications, the foamed polymeric compositions as described herein are particularly suitable for the fixation of display panels in mobile hand-held electronic devices.

Accordingly, the present disclosure is further directed to the use of a foamed polymeric composition or an assembly as described above for industrial applications.

The present disclosure is further directed to the use of a foamed polymeric composition or an assembly as described above for interior applications, in particular for construction market applications and transportation market applications, in particular automotive and aerospace applications, more in particular for taped seal on body, taped seal on door, exterior and interior parts attachment and weather-strip tape applications for the automotive industry.

The present disclosure is further directed to the use of a foamed polymeric composition or an assembly as described above for electronic applications, in particular for the fixation of display panels in mobile hand-held electronic devices.

The present disclosure is further directed to the use of a foamed polymeric composition or an assembly as described above for bonding to a low surface energy substrate and/or a medium surface energy substrate, in particular automotive clear coats/paints.

In another aspect, the present disclosure is directed to the use of a planetary roller extruder for the foaming of a polymeric composition with a physical foaming agent.

In another aspect, the present disclosure is directed to the use of a planetary roller extruder for reducing volatile organic compounds from a polymeric composition foamed with a physical foaming agent.

In still another, the present disclosure is directed to the use of an extrusion apparatus as described above for the foaming of a polymeric composition with a physical foaming agent.

In yet another, the present disclosure is directed to the use of an extrusion apparatus as described above for reducing volatile organic compounds from a polymeric composition foamed with a physical blowing agent.

In an advantageous aspect of the various uses described above, the physical foaming agent for use herein is provided in supercritical conditions of the physical foaming agent.

Item 1 is an extrusion apparatus (suitable for forming a foamed polymeric composition or for foaming a polymeric composition) comprising:

a) a planetary roller extruder;

b) a melt (gear) pump arranged (directly) downstream of the extruder;

c) optionally, a fluid feeding equipment;

d) a static cooling mixer equipment arranged (directly) downstream of the melt pump; and e) a foaming equipment arranged (directly) downstream of the static cooling mixer equipment.

Item 2 is an apparatus according to item 1, wherein the static cooling mixer equipment comprises a static (injection) mixer and a cooling mixer.

Item 3 is an apparatus according to any of item 1 or 2, wherein the static (injection) mixer is directly arranged downstream of the melt pump, and the cooling mixer is directly arranged downstream of the static (injection) mixer.

Item 4 is an apparatus according to any of the preceding items, wherein the static (injection) mixer comprises static mixing elements, which are in particular not actively temperature controlled.

Item 5 is an apparatus according to any of the preceding items, wherein the cooling mixer comprises static mixing elements which are hollow, and temperature controlled, in particular by oil.

Item 6 is an apparatus according to any of the preceding items, which further comprises a fluid (gas) feeding equipment (injection port) which is in particular in fluid connection with the static cooling mixer equipment, more in particular with the static (injection) mixer.

Item 7 is an apparatus according to any of the preceding items, wherein the melt pump is designed such as to provide a first processing zone Z1 having a pressure P1 (low pressure zone) and a second processing zone Z2 having a pressure P2 (high pressure zone) within the melt pump.

Item 8 is an apparatus according to item 7, wherein the first processing zone Z1 and the second processing zone Z2 are two distinct processing zones, wherein P2 is greater than P1, wherein P2 is greater than 6.5 MPa, and wherein the difference between P1 and P2 is greater than 3 MPa.

Item 9 is an apparatus according to any of item 7 or 8, wherein P2 is greater than 7 MPa, greater than 7.5 MPa, greater than 8 MPa, greater than 10 MPa, greater than 12 MPa, greater than 15 MPa, greater than 18 MPa, greater than 20 MPa, greater than 23 MPa, greater than 25 MPa, or even greater than 28 MPa.

Item 10 is an apparatus according to any of items 7 to 9, wherein P2 is in a range from 7 to 30 MPa, from 7.5 to 30 MPa, from 8 to 28 MPa, from 10 to 28 MPa, from 15 to 28 MPa, from 18 to 28 MPa, or even from 20 to 28 MPa.

Item 11 is an apparatus according to any of the preceding items, wherein the foaming (and shaping) equipment is a foaming die, in particular a single layer or a multi-layer die.

Item 12 is an apparatus according to any of the preceding items, wherein the foaming equipment is selected from the group consisting of slot dies, tubular dies, annular dies, strand dies, single bubble dies, and double bubble dies.

Item 13 is an apparatus according to any of the preceding items, which further comprises degassing means, in particular vacuum pumps or vacuum degassing units.

Item 14 is an apparatus according to item 13, wherein the degassing means are in fluid connection with the planetary roller extruder, in particular with the downstream section of the planetary roller extruder.

Item 15 is an apparatus according to any of the preceding items, which further comprises any of solid feeders, liquid feeders, gas feeders, grid melters, drum unloaders, in particular along the processing unit of the planetary roller extruder.

Item 16 is an apparatus according to any of the preceding items, which is free of additional extrusion equipment, in particular free of additional hotmelt extrusion equipment, more in particular single screw extruder and twin-screw extruder.

Item 17 is a (continuous) process of manufacturing a foamed polymeric composition, comprising the steps of:

a) providing an extrusion apparatus comprising a planetary roller extruder and a foaming (and shaping) equipment arranged downstream of the extrusion apparatus;

b) providing a hot melt processable (thermoplastic or elastomeric) polymeric composition in the planetary roller extruder;

c) optionally, degassing the hot melt processable polymeric composition, in particular while the hot melt processable polymeric composition is still in the planetary roller extruder;

d) optionally, exposing the hot melt processable polymeric composition to increased pressure and temperature conditions, in particular to pressure and temperature conditions greater than the supercritical pressure ($P_c$) and the supercritical temperature ($T_c$) conditions for the physical foaming agent;

e) providing a physical foaming agent;

f) mixing the hot melt processable polymeric composition and the physical foaming agent (provided in supercritical conditions) in the extrusion apparatus thereby forming a precursor of a foamed polymeric composition;

g) optionally, reducing the pressure and/or temperature conditions of the precursor of a foamed polymeric composition, whereby the pressure and temperature conditions are still greater than the supercritical pressure ($P_c$) and the supercritical temperature ($T_c$) conditions for the physical foaming agent; and h) passing the precursor of the foamed polymeric composition through the foaming (and shaping) equipment and exposing the composition to a reduced pressure, whereby the physical foaming agent expands resulting in foaming of the precursor of a foamed polymeric composition, in particular at the time it exits the foaming (and shaping) equipment.

Item 18 is a process according to item 17, wherein the step of mixing the hot melt processable polymeric composition and the physical foaming agent is performed in such pressure and temperature conditions sufficient for the physical foaming agent to be uniformly distributed throughout the hot melt processable polymeric composition.

Item 19 is a process according to any of item 17 or 18, wherein the physical foaming agent is provided and mixed with the hot melt processable polymeric composition in supercritical conditions of the physical foaming agent, in particular in pressure and temperature conditions greater than the supercritical pressure (Pc) and the supercritical temperature (Tc) conditions for the physical foaming agent.

Item 20 is a process according to any of items 17 to 19, wherein the supercritical pressure (Pc) is greater than 6.5 MPa, greater than 7 MPa, greater than 7.5 MPa, greater than 8 MPa, greater than 10 MPa, greater than 12 MPa, greater than 15 MPa, greater than 18 MPa, greater than 20 MPa, greater than 23 MPa, greater than 25 MPa, or even greater than 28 MPa.

Item 21 is a process according to any of items 17 to 20, wherein the supercritical pressure (Pc) is in a range from 7 to 30 MPa, from 7.5 to 30 MPa, from 8 to 28 MPa, from 10 to 28 MPa, from 15 to 28 MPa, from 18 to 28 MPa, or even from 20 to 28 MPa.

Item 22 is a process according to any of items 17 to 21, wherein the supercritical temperature (Tc) is greater than 70° C., greater than 80° C., greater than 90° C., greater than 100° C., greater than 120° C., greater than 140° C., greater than 150° C., greater than 160° C., greater than 180° C., greater than 200° C., greater than 220° C., greater than 240° C., greater than 250° C., greater than 260° C., or even greater than 280° C.

Item 23 is a process according to any of items 17 to 22, wherein the supercritical temperature (Tc) is no greater than 250° C., no greater than 220° C., no greater than 200° C., no greater than 190° C., no greater than 180° C., no greater than 170° C., or even no greater than 160° C.

Item 24 is a process according to any of items 17 to 23, wherein the supercritical temperature (Tc) is in a range from 75 to 250° C., from 75 to 220° C., from 75 to 180° C., from 80 to 180° C., from 100 to 170° C., from 100 to 165° C., from 110 to 165° C., from 120 to 165° C., from 130 to 165° C., from 140 to 165° C., from 140 to 160° C., or even from 150 to 160° C.

Item 25 is a process according to any of items 17 to 24, wherein the step of reducing the pressure and temperature of the precursor of a foamed polymeric composition, whereby the pressure and temperature conditions are still greater than the supercritical pressure (Pc) and the supercritical temperature (Tc) conditions for the physical foaming agent, is performed such that the reduced temperature is equal to or less than 50° C. below the initial temperature of the precursor of a foamed polymeric composition.

Item 26 is a process according to any of items 17 to 25, wherein the step of reducing the pressure and temperature of the precursor of a foamed polymeric composition, whereby the pressure and temperature conditions are still greater than the supercritical pressure (Pc) and the supercritical temperature (Tc) conditions for the physical foaming agent, is performed such that the reduced temperature is no greater than 250° C., no greater than 220° C., no greater than 200° C., no greater than 180° C., no greater than 150° C., no greater than 140° C., no greater than 130° C., no greater than 120° C., no greater than 110° C., no greater than 100° C., or even no greater than 90° C.

Item 27 is a process according to any of items 17 to 26, wherein the step of reducing the pressure and temperature conditions of the precursor of a foamed polymeric composition, whereby the pressure and temperature conditions are still greater than the supercritical pressure (Pc) and the supercritical temperature (Tc) conditions for the physical foaming agent, is performed such that the reduced pressure is no greater than 20 MPa, no greater than 19 MPa, no greater than 18 MPa, no greater than 17 MPa, no greater than 16 MPa, no greater than 15 MPa, no greater than 14 MPa, or even no greater than 13 MPa.

Item 28 is a process according to any of items 17 to 27, wherein the step of reducing the pressure and temperature of the precursor of a foamed polymeric composition, whereby the pressure and temperature conditions are still greater than the supercritical pressure (Pc) and the supercritical temperature (Tc) conditions for the physical foaming agent, is performed such that the reduced pressure is in a range from 8 to 18 MPa, from 9 to 16 MPa, from 10 to 15 MPa, from 11 to 15 MPa, from 11 to 14 MPa, from 12 to 14 MPa, or even from 12 to 13 MPa.

Item 29 is a process according to any of items 17 to 28, wherein the step of passing the precursor of the foamed polymeric composition through the foaming equipment and exposing the composition to a reduced pressure, is performed at (about) atmospheric pressure (101.3 kPa).

Item 30 is a process according to any of items 17 to 29, wherein the step of passing the precursor of the foamed polymeric composition through the foaming equipment and exposing the composition to a reduced pressure, is performed at a temperature greater than 20° C., greater than 25° C., greater than 40° C., greater than 80° C., greater than 100° C., greater than 150° C., or even greater than 200° C.

Item 31 is a process according to any of items 17 to 30, wherein the step of passing the precursor of the foamed polymeric composition through the foaming equipment and exposing the composition to a reduced pressure, is performed at a temperature no greater than 250° C., no greater than 220° C., no greater than 200° C., no greater than 180° C., no greater than 150° C., no greater than 120° C., no greater than 110° C., no greater than 100° C., or even no greater than 90° C.

Item 32 is a process according to any of items 17 to 31, wherein the step of passing the precursor of the foamed polymeric composition through the foaming equipment and exposing the composition to a reduced pressure, is performed at a temperature in a range from 25 to 250° C., from 25 to 220° C., from 25 to 200° C., from 25 to 180° C., from 25 to 160° C., from 25 to 140° C., from 25 to 120° C., from 25 to 110° C., from 30 to 110° C., from 40 to 100° C., from 50 to 100° C., from 60 to 100° C., from 60 to 95° C., from 70 to 95° C., or even from 70 to 90° C.

Item 33 is a process according to any of items 17 to 32, wherein the step of passing the precursor of the foamed polymeric composition through the foaming (and shaping) equipment and exposing the composition to a reduced pressure causes nucleation of the physical foaming agent and cell formation within the precursor of a foamed polymeric composition.

Item 34 is a process according to any of items 17 to 33, wherein the physical foaming agent is selected from the group consisting of carbon dioxide, nitrogen, $SF_6$, nitrous oxide, perfluorinated fluids, hydrofluorocarbons, hydrochlorofluorocarbons, hydrocarbons (such as e.g. heptane, pentane), argon, helium, noble gases, air (nitrogen and oxygen blend), and any combinations or mixtures thereof.

Item 35 is a process according to any of items 17 to 34, wherein the foaming agent is selected from the group consisting of carbon dioxide, nitrogen, air, and any combinations or mixtures thereof.

Item 36 is a process according to any of items 17 to 35, wherein the physical foaming agent is selected to comprise carbon dioxide.

Item 37 is a process according to any of items 17 to 36, wherein the physical foaming agent consists of carbon dioxide.

Item 38 is a process according to any of items 17 to 37, wherein the hot melt processable polymeric composition is selected from the group consisting of thermoplastic materials, elastomeric materials, thermoplastic elastomer materials, thermoplastic non-elastomeric materials, and any combinations or mixtures thereof.

Item 39 is a process according to any of items 17 to 38, wherein the hot melt processable polymeric material is selected from the group consisting of (amorphous or semi-crystalline) thermoplastic materials, and any combinations or mixtures thereof.

Item 40 is a process according to any of items 17 to 39, wherein the hot melt processable polymeric composition is selected from the group consisting of pressure sensitive adhesive thermoplastic compositions.

Item 41 is a process according to any of items 17 to 40, wherein the hot melt processable polymeric composition is selected from the group consisting of rubber-based elastomeric materials, rubber-based non-elastomeric materials, polycarbonates, polyacrylics, polyacrylonitriles, polyvinyl chlorides, alkylene-vinyl acetate copolymers, alkylene-acrylic acid copolymers, polyurethanes, polyesters, polyamides, polyolefins, polyphenylene oxides, and any combinations or mixtures thereof.

Item 42 is a process according to any of items 17 to 41, wherein the hot melt processable polymeric material is selected from the group consisting of rubber-based elastomeric materials, rubber-based non-elastomeric materials, polyacrylics, and any combinations or mixtures thereof.

Item 43 is a process according to any of items 17 to 42, wherein the hot melt processable polymeric material is selected from the group consisting of rubber-based (thermoplastic) elastomeric materials.

Item 44 is a process according to item 43, wherein the rubber-based (thermoplastic) elastomeric material is selected from the group consisting of olefinic block copolymers, acrylate block copolymers, styrenic block copolymers, styrene-isoprene-styrene block copolymers, styrene-butadiene-styrene block copolymers, styrene-ethylene/butadiene-styrene block copolymers, styrene-ethylene/propylene-styrene block copolymers, styrene-butadiene random copolymers, polyisoprene polymers, polybutadiene polymers, halogenated butyl rubbers, and any combinations or mixtures thereof.

Item 45 is a process according to any of item 43 or 44, wherein the rubber-based (thermoplastic) elastomeric material comprises a block copolymer architecture and is in particular selected from the group consisting of olefinic block copolymers, acrylate block copolymers, styrenic block copolymers, styrene-isoprene-styrene block copolymers, styrene-butadiene-styrene block copolymers, styrene-ethylene/butadiene-styrene block copolymers, styrene-ethylene/propylene-styrene block copolymers, and any combinations or mixtures thereof.

Item 46 is a process according to any items 43 to 45, wherein the rubber-based (thermoplastic) elastomeric material is selected from the group consisting of styrenic block copolymers, in particular styrene-isoprene-styrene block copolymers and styrene-butadiene-styrene block copolymers.

Item 47 is a process according to any of items 17 to 46, wherein the step of hotmelt processing the polymeric composition in the planetary roller extruder is performed at a processing pressure no greater than 4.0 MPa, no greater than 3.5 MPa, no greater than 2.5 MPa, no greater than 2.0 MPa, no greater than 1.5 MPa, or even no greater than 1.0 MPa.

Item 48 is a process according to any of items 17 to 47, wherein the optional step of degassing the hot melt processable polymeric composition is performed while the hot melt processable polymeric composition is still in the planetary roller extruder.

Item 49 is a process according to any of items 17 to 48, wherein the optional degassing step is performed using degassing means, in particular vacuum pumps or vacuum degassing units.

Item 50 is a process according to item 49, wherein the degassing means are in fluid connection with the planetary roller extruder, in particular with the downstream section of the planetary roller extruder.

Item 51 is a process according to any of items 17 to 50, wherein the extrusion apparatus is according to any of items 1 to 16.

Item 52 is a process according to item 51, wherein the optional step of exposing the hot melt processable polymeric composition to increased pressure conditions, in particular to pressure conditions greater than the supercritical pressure ($P_c$) for the physical foaming agent, is performed (exclusively) in the melt pump, in particular in the second processing zone Z2 of the melt pump.

Item 53 is a process according to any of item 51 or 52, wherein the optional step of exposing the hot melt processable polymeric composition to increased temperature conditions, in particular to temperature conditions greater than the supercritical temperature ($T_a$) conditions for the physical foaming agent, is performed at least partly in the melt pump, in particular in the second processing zone Z2 of the melt pump.

Item 54 is a process according to any of items 51 to 53, wherein the step of providing a physical foaming agent is performed in the static cooling mixer equipment, in particular in the static (injection) mixer part of the static cooling mixer equipment.

Item 55 is a process according to any of items 51 to 54, wherein the step of providing a physical foaming agent is performed using a fluid (gas) feeding equipment (injection port) in fluid connection with the static cooling mixer equipment, in particular with the static (injection) mixer part of the static cooling mixer equipment.

Item 56 is a process according to any of items 51 to 55, wherein the step of mixing the hot melt processable polymeric composition and the physical foaming agent thereby forming a precursor of a foamed polymeric composition, is performed in the static cooling mixer equipment, in particular through the entire length of the static cooling mixer equipment.

Item 57 is a process according to any of items 51 to 56, wherein the optional step of reducing the pressure and temperature conditions of the precursor of a foamed polymeric composition, whereby the pressure and temperature conditions are still greater than the supercritical pressure ($P_c$) and the supercritical temperature ($T_c$) conditions for the physical foaming agent, is performed (at least partly) in the static cooling mixer equipment.

Item 58 is a process of reducing volatile organic compounds from a polymeric composition foamed with a physical foaming agent, which comprises the step of using a planetary roller extruder.

Item 59 is a process according to item 58, which comprises the steps of:
- a) providing an extrusion apparatus comprising a planetary roller extruder and a foaming (and shaping) equipment arranged downstream of the extrusion apparatus;
- b) providing a hot melt processable (thermoplastic or elastomeric) polymeric composition in the planetary roller extruder;
- c) optionally, degassing the hot melt processable polymeric composition, in particular while the hot melt processable polymeric composition is still in the planetary roller extruder;
- d) optionally, exposing the hot melt processable polymeric composition to increased pressure and temperature conditions, in particular to pressure and temperature conditions greater than the supercritical pressure ($P_c$) and the supercritical temperature ($T_a$) conditions for the physical foaming agent;
- e) providing a physical foaming agent;
- f) mixing the hot melt processable polymeric composition and the physical foaming agent (provided in supercritical conditions) in the extrusion apparatus thereby forming a precursor of a foamed polymeric composition;

- g) optionally, reducing the pressure and/or temperature conditions of the precursor of a foamed polymeric composition, whereby the pressure and temperature conditions are still greater than the supercritical pressure ($P_c$) and the supercritical temperature ($T_a$) conditions for the physical foaming agent; and
- h) passing the precursor of the foamed polymeric composition through the foaming (and shaping) equipment and exposing the composition to a reduced pressure (in particular atmospheric pressure), whereby the physical bowing agent expands resulting in foaming of the precursor of a foamed polymeric composition, in particular at the time it exits the foaming.

Item 60 is a process according to any of item 58 or 59, wherein the polymeric composition is foamed with a physical foaming agent provided in supercritical conditions of the physical foaming agent.

Item 61 is a process according to any of items 58 to 60, wherein the extrusion apparatus is according to any of items 1 to 16.

Item 62 is a foamed polymeric composition obtained from the process according to any of items 17 to 61.

Item 63 is a foamed polymeric composition according to item 62, which has a Volatile Organic Compound (VOC) value of less than 400 ppm, less than 380 ppm, less than 360 ppm, less than 350 ppm, less than 340 ppm, less than 300 ppm, less than 280 ppm, less than 260 ppm, less than 250 ppm, less than 240 ppm, less than 220 ppm, less than 200 ppm, less than 180 ppm, less than 160 ppm, or even less than 150 ppm, when measured by thermal desorption analysis according to test method VDA278.

Item 64 is a foamed polymeric composition according to any of item 62 or 63, which has a density in a range from 0.30 to 0.65 g/cm³, from 0.35 to 0.65 g/cm³, from 0.40 to 0.65 g/cm³, from 0.40 to 0.60 g/cm³, from 0.45 to 0.60 g/cm³, from 0.45 to 0.55 g/cm³, or even from 0.45 to 0.55 g/cm³, when measured according to test method ASTM D792.

Item 65 is a foamed polymeric composition according to any of items 62 to 64, which has an average cell size no greater than 300 micrometers, no greater than 280 micrometers, no greater than 260 micrometers, no greater than 240 micrometers, no greater than 220 micrometers, no greater than 200 micrometers, no greater than 180 micrometers, no greater than 160 micrometers, no greater than 140 micrometers, no greater than 120 micrometers, no greater than 100 micrometers, no greater than 80 micrometers, no greater than 70 micrometers, no greater than 60 micrometers, no greater than 50 micrometers, or even no greater than 40 micrometers.

Item 66 is a foamed polymeric composition according to any of items 62 to 65, which has an average cell size in a range from 30 to 350 micrometers, from 40 to 320 micrometers, from 40 to 300 micrometers, from 40 to 280 micrometers, from 50 to 260 micrometers, from 50 to 240 micrometers, from 50 to 220 micrometers, from 60 to 200 micrometers, from 60 to 180 micrometers, or even from 70 to 180 micrometers.

Item 67 is a foamed polymeric composition according to any of items 62 to 66, which has a cell size distribution polydispersity in a range from 1.0 to 2.0, or even from 1.0 to 1.5.

Item 68 is a foamed polymeric composition according to any of items 62 to 67, which is a foamed pressure sensitive adhesive composition.

Item 69 is an assembly comprising a foamed polymeric composition layer according to any of items 62 to 68.

Item 70 is an assembly according to item 69, which further comprises a second polymeric layer adjacent to the foamed polymeric composition layer.

Item 71 is an assembly according to item 70, which is in the form of a skin/core multilayer assembly, wherein the foamed polymeric layer is the core layer of the assembly and the second polymeric layer is the skin layer of the assembly.

Item 72 is an assembly according to any of item 70 or 71, which further comprises a third polymeric layer which is preferably adjacent to the foamed polymeric layer in the side of the foamed polymeric layer which is opposed to the side of the foamed polymeric layer adjacent to the second polymeric layer.

Item 73 is an assembly according to item 72, which is in the form of a skin/core/skin multilayer assembly, wherein the foamed polymeric layer is the core layer of the multi-layer assembly, the second polymeric layer is the first skin layer of the multilayer assembly and the third polymeric layer is the second skin layer of the multilayer assembly.

Item 74 is an assembly according to any of items 69 to 73, which is a (multilayer) pressure sensitive adhesive assembly, wherein the foamed polymeric layer and/or the second polymeric layer and/or the third polymeric layer are layers based on pressure sensitive adhesive compositions.

Item 75 is an assembly according to any of items 69 to 73, which is a (multilayer) pressure sensitive adhesive assembly, wherein the foamed polymeric layer is not based on a pressure sensitive adhesive composition and the second polymeric layer and the third polymeric layer are layers based on pressure sensitive adhesive compositions.

Item 76 is the use of a foamed polymeric composition according to any of items 62 to 68 or an assembly according to any of items 69 to 75 for industrial applications.

Item 77 is the use according to item 76 for interior applications, in particular for construction market applications and transportation market applications, in particular automotive and aerospace applications, more in particular for taped seal on body, taped seal on door, exterior and interior parts attachment and weather-strip tape applications for the automotive industry.

Item 78 is the use according to item 76 for electronic applications, in particular for the fixation of display panels in mobile hand-held electronic devices.

Item 79 is the use according to item 76 for the bonding to a low surface energy substrate and/or a medium surface energy substrate, in particular automotive clear coats/paints.

Item 80 is the use of a planetary roller extruder for the foaming of a polymeric composition with a physical foaming agent.

Item 81 is the use of a planetary roller extruder for reducing volatile organic compounds from a polymeric composition foamed with a physical foaming agent.

Item 82 is the use of an extrusion apparatus according to any of items 1 to 16 for the foaming of a polymeric composition with a physical foaming agent.

Item 83 is the use of an extrusion apparatus according to any of items 1 to 16 for reducing volatile organic compounds from a polymeric composition foamed with a physical blowing agent.

Item 84 is the use according to any of items 80 to 83, wherein the physical foaming agent is provided in super-critical conditions of the physical foaming agent.

EXAMPLES

The present disclosure is further illustrated by the following examples. These examples are merely for illustrative purposes only and are not meant to be limiting on the scope of the appended claims.

Test Methods and Procedures:

Thermal Desorption Analysis of Organic Emissions According to VDA Test Method 278

VDA method 278 is a test method used for the determination of organic emissions from non-metallic trim components used to manufacture the interior of motor vehicles (VDA stands for "Verband der Automobilindustrie", the German Association of Automobilists). For the VOC value, the method involves determining the sum of volatile and semi-volatile compounds up to n-Caowhich are emitted.

For measuring the VOC values, samples of 30 mg+/−5 mg are weighed directly into empty glass sample tubes. The volatile and semi-volatile organic compounds are extracted from the samples into the gas stream and are then re-focused onto a secondary trap prior to injection into a Agilent 7890B GC system for analysis. An automated thermal desorber (Markes International Ultra-UNITY system) is hereby used for the VDA 278 testing.

For the VOC analysis, the test method comprises an extraction stage which involves desorbing the sample at 90° C. for 30 minutes to extract VOC's up to n-$C_{20}$. This is followed by a semi-quantitative analysis of each compound as μg toluene equivalents per gram of sample. The results expressed are the average of 2 measurements per sample. The higher value of the measurements is indicated as the result, as described in the VDA278 test method.

Raw Materials Used:

The raw materials and commercial adhesive tapes used are summarized below in Table 1.

TABLE 1

| Raw material list. | | |
| --- | --- | --- |
| Name | Description | Supplier |
| Kraton D1111 | Linear triblock copolymer based on styrene and butadiene with a polystyrene content of 31% | Kraton polymers |
| Kraton D1119 | Linear triblock copolymer based on styrene and butadiene with a polystyrene content of 22% | Kraton polymers |
| Kraton D1161 | Linear triblock copolymer based on styrene and butadiene with a polystyrene content of 15% | Kraton Polymers |
| PP Braskem DC 7057 | PP impact copolymer | Braskem |
| PP Daploy WB 140 HMS | Isomeric modified PP homopolymer | Borealis |
| Talc | Nucleating agent | Imerys Talc Belgium |
| $CO_2$ | Physical foaming agent, carbon dioxide gas | Linde |

Devices and Technical Elements Used:

The devices and technical elements used are summarized below in Table 2.

TABLE 2

| Devices and technical elements. | | |
| --- | --- | --- |
| Name | Description | Supplier |
| PWE70-M3 | Planetary roller extruder | Entex |
| Typ GPA 36/36-01 | Melt pump | Nordson Kreyenborg |
| P1 Static Cooling Mixer | Static cooling mixer | Promix Solutions AG |
| APV Die | Sheet extrusion foaming die | AxFlow |

The melt pump, the static cooling mixer and the foaming die are retrofitted to the planetary roller extruder as represented in FIG. 1.

Polymer Compounding and Sample Preparation:

Exemplary Preparation of Foamed Polymeric Compositions

The compositions of the exemplary foamed polymeric compositions (Examples E1 to E7) are listed in Table 3 below (in parts).

TABLE 3

Chemical composition of the exemplary foamed polymeric compositions.

|  | E1 | E2 | E3 | E4 | E5 | E6 | E7 |
|---|---|---|---|---|---|---|---|
| Kraton D1111 | 94 |  |  |  |  |  |  |
| Kraton D1119 |  |  | 94 | 88 | 86 | 81 |  |
| Kraton D1161 |  | 94 |  |  |  |  |  |
| PP DC 7057 |  |  |  |  |  |  | 37 |
| PP WB 140 HMS |  |  |  |  |  |  | 55 |
| Talc | 4 | 4 | 4 | 10 | 10 | 18 | 7 |
| CO$_2$ | 2 | 2 | 2 | 2 | 4 | 1 | 1 |

Foamed Polymeric Composition Preparation

The foamed polymeric compositions are made using the extrusion apparatus as detailed in Table 2. The extrusion apparatus comprises a total of 8 heat zones: three in the planetary roller extruder, one in the melt pump, two in the static cooling mixer, one in the foaming die, and one in the heated hose which makes the junction between the static cooling mixer and the foaming die. The processing conditions, in particular the temperature and pressure profile of the extrusion apparatus, are described in Tables 4 and 5 below.

Examples E1 to E6

TABLE 4

Processing conditions (temperature profile) for the exemplary foamed polymeric compositions E1 to E6.

| Zone (Barrel) | Temperature (° C.) | Description |
|---|---|---|
| Z1 (Planetary extruder) | 180 | Feeding of Kraton polymer and talc (10 kg/h) |
| Z2 (Planetary extruder) | 180 |  |
| Z3 (Planetary extruder) | 180 |  |
| Z4 (Melt Pump) | 180 |  |
| Z5 (Static mixer composition - electrical heating of surface) | 235 | Injection of super critical CO$_2$ |
| Z6 (Static mixer composition - cooling of static mixing elements with oil) | 155 |  |
| Z7 (Heated hose) | 160 |  |
| Z8 (Foaming Die) | 120 | Coating and expansion of the melt |

The screw speed is set at 100 rpm at a throughput of 10 kg/h. The melted polymer enters the melt pump at a pressure of 2.5 MPa. The pressure is increased to values in a range from 22 to 26 MPa at the exit of the melt pump. The static cooling mixer composition creates a pressure loss in a range from 5.6 to 12 MPa. The pressure at the entry of the foaming die is as shown in Table 5 below.

TABLE 5

Processing conditions (pressure profile) for the exemplary foamed polymeric compositions E1 to E6.

|  | E1 | E2 | E3 | E4 | E5 | E6 |
|---|---|---|---|---|---|---|
| Pressure at entry to foaming die [MPa] | 15 | 15.5 | 15.8 | 15.8 | 16.9 | 9.8 |

Example E7

TABLE 6

Processing conditions (temperature profile) for the exemplary foamed polymeric composition E7.

| Zone (Barrel) | Temperature (° C.) | Description |
|---|---|---|
| Z1 (Planetary extruder) | 200 | Feeding of PP polymers and talc (7.5 kg/h) |
| Z2 (Planetary extruder) | 200 |  |
| Z3 (Planetary extruder) | 200 |  |
| Z4 (Melt Pump) | 190 |  |
| Z5 (Static mixer composition - electrical heating of surface) | 230 | Injection of super critical CO$_2$ |
| Z6 (Static mixer composition - cooling of static mixing elements with oil) | 160 |  |
| Z7 (Heated hose) | 160 |  |
| Z8 (Foaming Die) | 140 | Coating and expansion of the melt |

The screw speed is set at 100 rpm at a throughput of 7.5 kg/h. The melted polymer enters the melt pump at a pressure of 1 MPa. The pressure is increased to 24 MPa at the exit of the melt pump. The static cooling mixer composition creates a pressure loss of 10 MPa. The pressure at the entry of the foaming die is 10.7 MPa.

Test Results:

Foam Density

The foam density of the foamed polymeric compositions of Examples E1 to E7 are determined according to Test method ASTM D792. The results are described in Table 7 below.

TABLE 7

Foam density measurements

|  | E1 | E2 | E3 | E4 | E5 | E6 | E7 |
|---|---|---|---|---|---|---|---|
| Foam Density (g/cm$^3$) | 0.66 | 0.75 | 0.77 | 0.83 | 0.83 | 0.85 | 0.25 |

As can be seen from the results of Table 7, foamed polymeric compositions having a broad range of foam densities may be obtained according to the present disclosure.

Compression

The compression set characteristics of the foamed polymeric compositions of Examples E1 to E7 under load and without load are determined according to the following test procedure. Samples with an area of 25.4 mm×25.4 mm and a thickness between 5-10 mm are prepared. The foamed samples are compressed at maximum force between two plates. The reduction of thickness (compression set under load in %) relative to the initial thickness is measured after 24 h compression under maximum force. The compression set without load (in %) describes the thickness which is achieved after removing the compression, relative to the initial thickness. The compression set without load is measured 24 h after removal of the compression force. The percentage for compression set under load and for the compression set without load are measured as follows:

$$\text{Compression set under load, } \% = (t_{24\ h\ compressed\ under\ load} \times 100)/(t_{initial} - 100)$$

$$\text{Compression set without load, } \% = (t_{24\ h\ after\ removal\ of\ compression\ force} \times 100)/(t_{initial} - 100)$$

The results are described in Table 8 below.

TABLE 8

| Mechanical properties measurements | | | | | | | |
|---|---|---|---|---|---|---|---|
| | E1 | E2 | E3 | E4 | E5 | E6 | E7 |
| Compression set 24 h under load (%) | 34 | 35 | 39 | 37 | 42 | 37 | 39 |
| Compression set 24 h after removal of compression force (%) | 94 | 89 | 89 | 85 | 84 | 97 | 66 |

As can be seen from the results of Table 8, the foamed polymeric compositions according to the present disclosure have advantageous mechanical properties.

The invention claimed is:

1. An extrusion apparatus comprising:
   a) a planetary roller extruder;
   b) a melt pump arranged downstream of the planetary roller extruder;
   c) optionally, a fluid feeding equipment;
   d) a two-part static cooling mixer equipment arranged downstream of the melt pump, the two-part static cooling mixer equipment comprised of:
      a static mixer having mixing elements that are either electrically heated or not actively temperature controlled; and
      a cooling mixer directly arranged downstream of the static mixer and having mixing elements that are hollow and temperature controlled by oil; and
   e) a foaming equipment arranged downstream of the static cooling mixer equipment.

2. An apparatus according claim 1, wherein the melt pump is designed such as to provide a first processing zone Z1 having a pressure P1 and a second processing zone Z2 having a pressure P2 within the melt pump.

3. An apparatus according to claim 2, wherein the first processing zone Z1 and the second processing zone Z2 are two distinct processing zones, wherein P2 is greater than P1, wherein P2 is greater than 6.5 MPa, and wherein the difference between P1 and P2 is greater than 3 MPa.

4. An apparatus according to claim 1, comprising fluid feeding equipment in fluid connection with the static mixer.

5. An apparatus according to claim 4, wherein the fluid feeding equipment comprises an injection port in the static mixer.

* * * * *